US009837824B2

(12) United States Patent
Kjær et al.

(10) Patent No.: US 9,837,824 B2
(45) Date of Patent: Dec. 5, 2017

(54) CONNECTION SYSTEM FOR POWER GENERATION SYSTEM WITH DC OUTPUT

(75) Inventors: Philip Carne Kjær, Aarhus (DK); Dumitru-Mihai Valcan, Langå (DK); Lars Helle, Suldrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 318 days.

(21) Appl. No.: 14/425,203

(22) PCT Filed: Sep. 3, 2012

(86) PCT No.: PCT/DK2012/050329
§ 371 (c)(1),
(2), (4) Date: Mar. 19, 2015

(87) PCT Pub. No.: WO2014/032668
PCT Pub. Date: Mar. 6, 2014

(65) Prior Publication Data
US 2015/0263526 A1    Sep. 17, 2015

(51) Int. Cl.
*F03D 9/00* (2016.01)
*H02P 9/04* (2006.01)
*H02J 5/00* (2016.01)
*H02J 3/38* (2006.01)
*H02P 9/14* (2006.01)
*F03D 9/25* (2016.01)

(52) U.S. Cl.
CPC ............. *H02J 5/00* (2013.01); *F03D 9/255* (2017.02); *H02J 3/386* (2013.01); *H02P 9/14* (2013.01); *Y02E 10/763* (2013.01)

(58) Field of Classification Search
CPC .. H02J 5/00; F03D 9/255; H02S 10/12; H02P 9/14

USPC ........................................ 290/44, 55; 363/35
See application file for complete search history.

(56) References Cited

U.S. PATENT DOCUMENTS 3,932,765 A * 1/1976 Townsend ............... H02M 7/06
                                                                   307/149
4,425,539 A * 1/1984 Wills ....................... H02P 1/32
                                                                   318/771
(Continued)

FOREIGN PATENT DOCUMENTS

WO       2008039119 A1    4/2008
WO       2012093942 A1    7/2012

OTHER PUBLICATIONS

International Search Report for PCT/DK2012/050329, dated May 2, 2013.

*Primary Examiner* — Tulsidas C Patel
*Assistant Examiner* — Thomas Quigley
(74) *Attorney, Agent, or Firm* — Patterson + Sheridan, LLP

(57) ABSTRACT

The present invention relates to a connection system for connecting a power generator to a DC electrical power system, with a controllable voltage source unit functionally connected in series with the power generator to receive AC electrical power from the power generator, and to generate an AC electrical power output accordingly, and a rectifier arranged to receive AC electrical power output from said voltage source unit and to rectify the AC electrical power output to a DC electrical power to be provided to the DC electrical power system. The invention also relates to method for connecting a power generator to a DC electrical power system.

19 Claims, 9 Drawing Sheets

(56) References Cited

U.S. PATENT DOCUMENTS

| | | | | |
|---|---|---|---|---|
| 5,288,336 | A | * | 2/1994 | Strachan ................. H01L 35/32 |
| | | | | 136/200 |
| 6,437,996 | B1 | * | 8/2002 | Wobben .................... H02J 3/36 |
| | | | | 363/37 |
| 6,479,907 | B1 | * | 11/2002 | Eriksson ................. F03D 9/255 |
| | | | | 290/42 |
| 7,939,970 | B1 | | 5/2011 | Walling et al. |
| 2008/0157530 | A1 | | 7/2008 | Corcelles Pereira et al. |
| 2011/0141773 | A1 | | 6/2011 | Larsen et al. |
| 2011/0221195 | A1 | * | 9/2011 | Raju ....................... H02M 7/49 |
| | | | | 290/44 |
| 2013/0197704 | A1 | * | 8/2013 | Pan .......................... H02J 3/36 |
| | | | | 700/287 |

* cited by examiner

CONNECTION SYSTEM FOR POWER GENERATION SYSTEM WITH DC OUTPUT

FIELD

The present invention relates to a connection system for connecting a power generation system to a direct current power system.

BACKGROUND

High-voltage direct current (HVDC) connected wind power plants or other types of power plants as well, may be utilized to provide an electrical connection system between power generators and regional, national, or transnational transmission networks via high-voltage direct current (HVDC) converters & cables. Initial projects are under construction to provide HVDC subsea connections to offshore wind turbine generators. In these projects power is collected via medium-voltage alternating current (AC) subsea cables and is then stepped up to high-voltage AC at an offshore platform substation. An offshore HVDC converter rectifies the AC power to DC power and then transmits the DC power through an export cable to a land station converter. At the land station, the DC power may be inverted from DC power back to AC power to be fed into an electric grid. In such HVDC systems, voltage levels can be ±150 kV up to ±320 kV, or even higher.

In the above described system, the power systems of the wind turbine generators are configured conventionally, including an AC generator (for example permanent-magnet rotor synchronous machine) connected to a frequency converter (back-to-back AC/DC/AC). The converter rectifies generator power at variable frequency and variable voltage while outputting power to the collector grid at constant frequency and constant voltage, as occurs when connected to an AC transmission network. The voltage level is stepped up from a low voltage frequency converter level (690V, 50 Hz) to collector level (33 kV, 50 Hz) by a transformer of the wind turbine generator. Hence, the wind turbines generate AC power.

With such a conventional approach, the wind turbine generators experience an AC voltage as if connected directly to the AC transmission network on land since the offshore power collection grid is AC and has voltage levels of 33 kVac or even up to 66 kVac.

A problem of the prior art is that each wind turbine generator is equipped with a frequency converter, i.e. a complex electrical circuits, which may cause increased losses and reduced reliability.

SUMMARY

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an aspect, the present invention relates to a connection system for connecting a power generator to a DC electrical power system, comprising, a controllable voltage source unit functionally connected in series with the power generator to receive AC electrical power from the power generator, and to generate an AC electrical power output accordingly, and a rectifier arranged to receive AC electrical power output from said voltage source unit and to rectify the AC electrical power output to a DC electrical power to be provided to the DC electrical power system.

An advantage of the first aspect is mainly that the voltage source unit is able to adjust the voltage level between the generator and the rectifier accordingly to the present situation. This will ensure a proper flow of electrical current both reactive and active from the generator through the rectifier into the DC electrical system, although the flow of reactive power to the DC electrical system is limited.

According to one embodiment of the invention the connection system comprises a main transformer arranged to step up an AC voltage level between said voltage source unit and said rectifier.

An advantage of this embodiment is that the voltage level of the DC electrical system can be much higher than the AC level of the generator.

According to one embodiment of the invention the connection system further comprises the power generator, and wherein said power generator is a synchronous generator.

An advantage of this embodiment is that the synchronous generator is not magnetized through the stator windings of the generator, and thus less reactive power is needed.

According to one embodiment of the invention the voltage source unit comprises a transformer with a primary set of windings, that receive the AC electrical power from said power generator, and a secondary set of windings connected to an inverter, said inverter having an AC side and a DC side connected to a DC link capacitor.

An advantage of this embodiment is that the first inverter makes it possible to adjust the voltage level of the voltage source unit very fast and in a large range. The combination with the series transformer makes it possible to use a standard low voltage inverter i.e. 400V or 690V. By using a low voltage inverter allows for fast switching frequency, high reliability, and more standard inverter available in the marked.

According to one embodiment of the invention the voltage source unit comprises an inverter, said inverter having an AC side and a DC side, said DC side connected to a DC link capacitor and said AC side connected in series between said power generator and said rectifier.

An advantage of this embodiment is that there is no need for a series transformer, thus the inverter is connected directly between the generator and the main transformer.

According to one embodiment of the invention the inverter further comprises a dump load unit or a storage device.

An advantage of this embodiment is that having a dump load or a storage device allows the inverter to absorb active power from the power generation system, this may be needed in some unusual production modes. For storage there is a limitation, which relates to the size of the storage device, the dump load may be designed for short term dissipation of power or continuous dissipation.

According to one embodiment of the invention the voltage source unit comprises a converter, with an AC side and a DC side, said DC side of said converter connected to said DC side of the inverter, and said AC side of said converter connected to an auxiliary electrical system.

An advantage of this embodiment is that in addition to be able to absorb power for shorter period of time, the second inverter allows a continuous active power flow to or from the auxiliary electrical system, depending on the type of switches in the converter.

According to one embodiment of the invention the main transformer comprises three sets of windings, and said rectifier comprises a first multi-phase rectifier bridge and a second multi-phase rectifier bridge, a first set of said three sets of windings connected to said voltage source unit, a second set of said three sets of windings connected to said first multi-phase rectifier bridge and a third set of said three sets of windings connected to said second multi-phase rectifier bridge.

An advantage of this embodiment is that the DC transmission voltage can be increased as each high voltage winding connects to a rectifier bridge and the two bridges are connected in series. The two high voltage windings are phase shifted in respect of each other and thus the harmonic content from the system is reduced.

According to one embodiment of the invention the system comprises means for changing the winding configuration from a wye connection to a delta connection, said means being positioned in the transformer or in the power generator.

An advantage of this embodiment is that changing the winding configuration will change the transformation ratio of the transformer, so this feature is a rough voltage adaptation mean between generator and rectifier, it will thereby reduce the necessary working range for the series source unit.

According to one embodiment of the invention the main transformer comprises an on-load-tap charger for changing a transformation ratio of said main transformer.

An advantage of this embodiment is that, as for the winding configuration, the transformation ratio changes, and therefore will there be a voltage adaption between generator and rectifier. The tap changer will have a limited range, but will operate in smaller steps than what occurs when changing the winding configuration. Similar here, may this feature reduce the necessary working range for the series source unit.

According to one embodiment of the invention further comprises an excitation unit for exciting a rotor field winding of said power generator, said excitation unit designed for an operational speed range.

An advantage of this embodiment is that the excitation unit can provide sufficient field current even in the low speed range, meaning that the generator voltage level typically doesn't vary more than 10% over the power range.

In a second aspect, the present invention relates to a method for connecting a power generator to a DC electrical power system, the method comprising, connecting in series a voltage source unit, that receives AC electrical power from the power generator, controlling the AC electrical power, from the power generator and the voltage source unit to a rectifier, by adjusting at least one electrical parameter of the voltage source unit, and rectifying the AC electrical power to DC electrical power to be provided to the DC electrical power system.

According to one embodiment of the invention, the at least one electrical parameter, is an electrical voltage phase angle between the voltage source unit and the rectifier, and/or an amplitude of the voltage of the voltage source unit.

The advantages of the second aspect and its further embodiments are equivalent to the advantages for the first aspect of the present invention.

In a third aspect, the present invention relates to a power generation system for connecting to a DC electrical system, comprising a power generator, a rectifier, a main transformer with at least a first set of windings and a second set of windings, and a coupling device, wherein the rectifier is connected between the main transformer and the DC electrical system, and wherein the coupling device is arranged to change a connection configuration in at least one of said generator and said transformer between a delta connection and a wye connection.

The advantages of the third aspect and its embodiments are equivalent to the advantages for the first aspect of the present invention.

The individual aspects of the present invention may each be combined with any of the other aspects. These and other aspects of the invention will be apparent from the following description with reference to the described embodiments.

Any of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE FIGURES

The power generation system according to the invention will now be described in more detail with regard to the accompanying figures. The figures show one way of implementing the present invention and is not to be construed as being limiting to other possible embodiments falling within the scope of the attached claim set.

DETAILED DESCRIPTION

The present invention relates to a connection of a synchronous power generator 401, with fluctuating AC voltage output levels, to a HVDC rectifier 405, which has a nearly fixed voltage level, as the voltage level of the HVDC rectifier is dictated by the electrical grid and its system operator. In the following the present invention will be explained in more detail.

With the conventional approach as discussed in the background section, the offshore turbines experience an AC voltage as if connected directly to the AC network on land. The offshore power collection grid is AC—voltage levels of 33 kVac or even up to 66 kVac—created by the offshore HVDC converter.

The embodiment of the invention presented here relates mainly to a wind turbine generator, but is it not limited to wind power. Other sources of power production are also considered.

Potential efficiency improvements may be obtained by changing the electrical path from turbine generator to HVDC export cable. This involves turbines generating DC power to collector grids at voltage levels of ±20 kVdc, up to ±70 kVdc. The idea is to save power losses in the turbine electrical circuit, in the collector grid and in the offshore substation DC/DC conversion.

The applicant has appreciated that efficiency improvements may be gained with an electrical path from a wind turbine generator to a HVDC export cable constructed in an alternate arrangement to that described in the background. This involves turbines generating DC power to collector grids at voltage levels of ±20 kVdc, up to ±70 kVdc, and then transforming from these medium voltage levels to high voltage levels, such as from ±20-70 kVdc to ±150-320 kVdc, which may save power losses in electrical circuits of the wind turbine system, in the collector grid, and in the offshore substation DC/DC conversion. This last stage "transforms" from medium-voltage to high-voltage.

Figure 1:
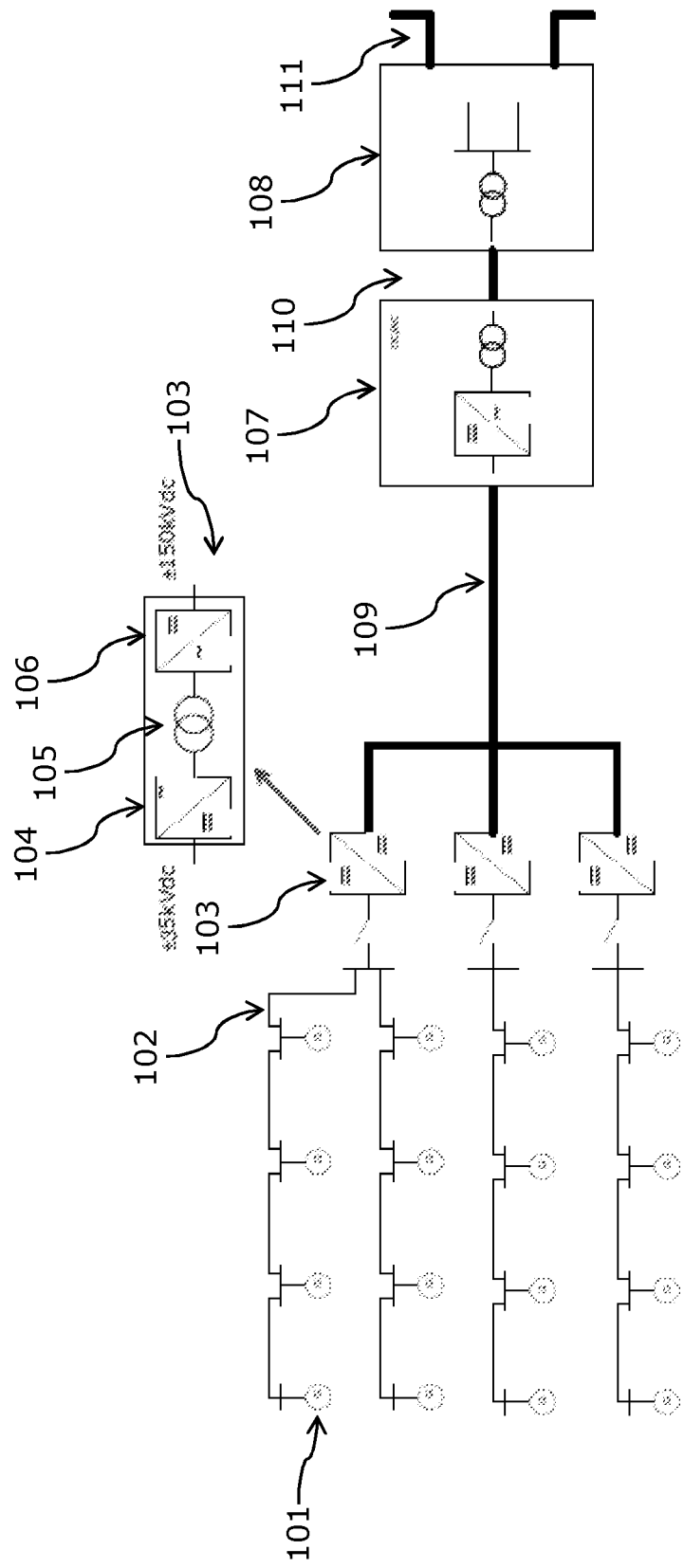
FIG. 1 is a single line diagram for a DC plant offshore connection, substation and collector network layout.

FIG. 1 shows a setup as mentioned above. A plurality of DC turbines 101 connected to a DC feeder 102, one or more feeders 102 supply a DC/DC converter module 103. The DC/DC converter module consist of a DC/AC inverter 104, that converter the DC power to AC power, the AC power is then transformed to a higher voltage level through a transformer 105, the AC power now with a higher AC voltage level is the rectified back into DC in the rectifier 106. The DC power is fed into a DC transmission line/cable 109. The voltage level in the DC feeder 102 is much lower than in DC transmission line 109. The level in the DC feeder is in the example ±35 kVdc and in the DC transmission line ±150 kVdc. The DC transmission line 109 ends in an HVDC inverter station 107, wherein the DC power is converted back into AC power and a step-up transformer to an even higher voltage level. The output of the HVDC station 107, supplied to a medium or high voltage transmission line 110. The transmission system 108 comprises yet another step-up transformer before the power is branched into different transmission lines 111.

Figure 2:
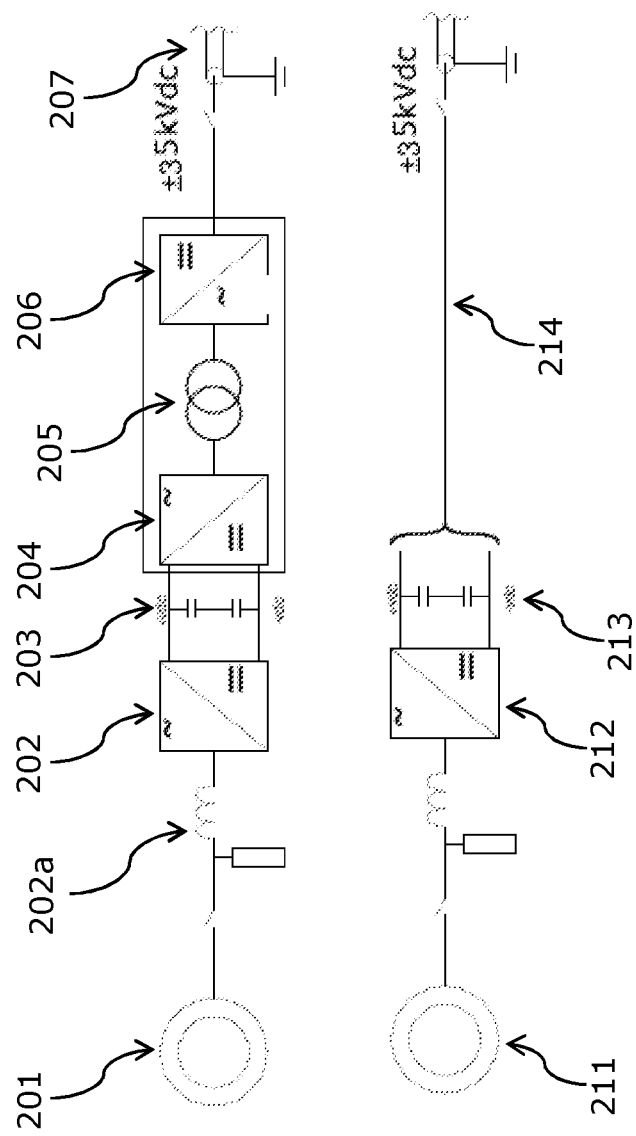
FIG. 2 shows candidate turbine DC generation circuits.
Figure 3:
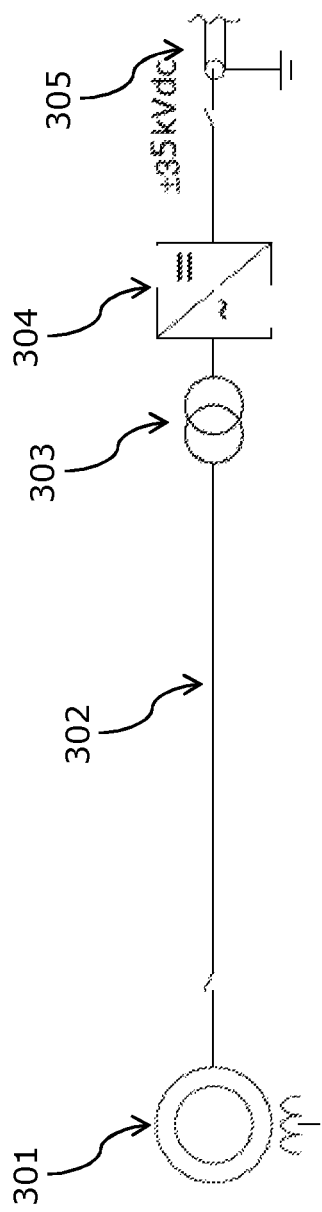
FIG. 3 shows a prior art turbine DC generation circuit on which this invention is based.

The generator voltage level in FIGS. 2 and 3 may be a nominal voltage for the low voltage bus in a range from 1 to 10 kV. The nominal voltage is not to be understood as a fixed voltage, as the nominal voltage may vary between 1 to 10 kV as a function of speed. Among the conventional candidate solutions for turbine electrical circuits are simple and complex ones. The upper portion of FIG. 2 shows an example, where a permanent magnet generator 201 operates at variable-voltage and variable-frequency, (for example 0-3 kV and 0-65 Hz). The permanent magnet generator 201 feeds, through a filter 202a, a rectifier 202 at ±2.5 kVdc, where the rectifier 202 has a DC link capacitor 203. The DC link is connected with a DC/DC converter transforming from ±2.5 kVdc to ±30 kVdc through a step-up transformer 205. The DC/DC converter consists of an inverter 204, which can operate as a 1 kHz zero-current switching series-resonant circuit, followed by a step-up transformer 205, and another rectifier 206 coupled with a DC cable 207. The transformer 205 is imperative and embedded in the converter. The medium-voltage side of the DC/DC converter is an active rectifier.

To reduce circuit complexity, number of forced-commutated semiconductors and losses, a conceptually simple solution is to use an electrically excited synchronous generator with a diode rectifier to generate DC. To reach collector voltage levels of ±20-70 kVdc, the turbine AC voltage would have to be so high, that only a cable-wound machines could qualify. Hence, a transformer between generator and rectifier is envisaged. FIG. 2 lower part shows an example with a high voltage generator 211 connected to a rectifier 212, from which DC power feeds into a DC cable 214, parallel to the cable 214 is a DC link capacitor.

A similar design, but with a transformer is illustrated in FIG. 3. A generator 301, connected to a low/medium voltage cable 302 that connects to a transformer 303, which step-up the voltage to 50-70 kVac, a rectifier 304, rectifies AC to DC. The DC power feeds into a DC cable 305.

The synchronous generator electromotive force (EMF) is proportional to rotational speed and air gap flux density. A generator at fixed speed and fixed terminal voltage typically varies its field current from 1pu at no-load up to 3pu at full-load. If the speed is halved, the voltage is halved, unless the flux level is doubled. To avoid deep saturation, the generator would need to be oversized, in order to be able to handle that the speed is halved or voltage is halved. In short, simply controlling generator excitation is insufficient to maintain a near-constant terminal voltage across turbine speed ranges and load levels, or if possible, it would be a very inefficient use of generator ratings.

Hence, a passive rectifier is difficult to employ in this circuit, and active rectifiers at high voltage levels imply high cost and losses, as the active rectifier causes higher losses compared to a passive rectifier.

The embodiments in FIG. 1 to FIG. 3 all show various topologies of how to make a wind turbine generator with a DC output terminal. FIG. 1 and FIG. 2 shows topologies that still suffer from low efficiency and complex circuits. FIG. 3 shows a simple circuit, but with highly variable output voltage.

The armature winding of a synchronous machine 301,501 is almost invariably on the stator and is usually a three phase winding, but not limited to that. The field winding 502 is usually on the rotor and excited by Direct Current (DC), or permanent magnets. The DC power supply required for excitation, usually is supplied through a DC generator known as exciter 503, which is often mounted on the same shaft as the synchronous machine. Various excitation systems 503 using DC exciter and solid state rectifiers are used with large turbine generators.

Assuming brushless excitation, the generator rotor carries a rectifier circuit 503, feeding the field winding from the exciter 3-phase rotor winding 502. The exciter machine stator 501 carries a DC excited winding, fed from a 3-phase thyristor rectifier.

The field current $I_f$ can be varied from 0 to $I_{f,max}$, and will depend on thyristor firing angle and rotational speed. The time constant of the excitation depends on the generator impedances and load point. In general, the time constant of an excitation systems, for a synchronous machine, is several times larger than the time constant of a series transformer 506 and converter 507 according to an embodiment of the present invention.

Figure 5A:
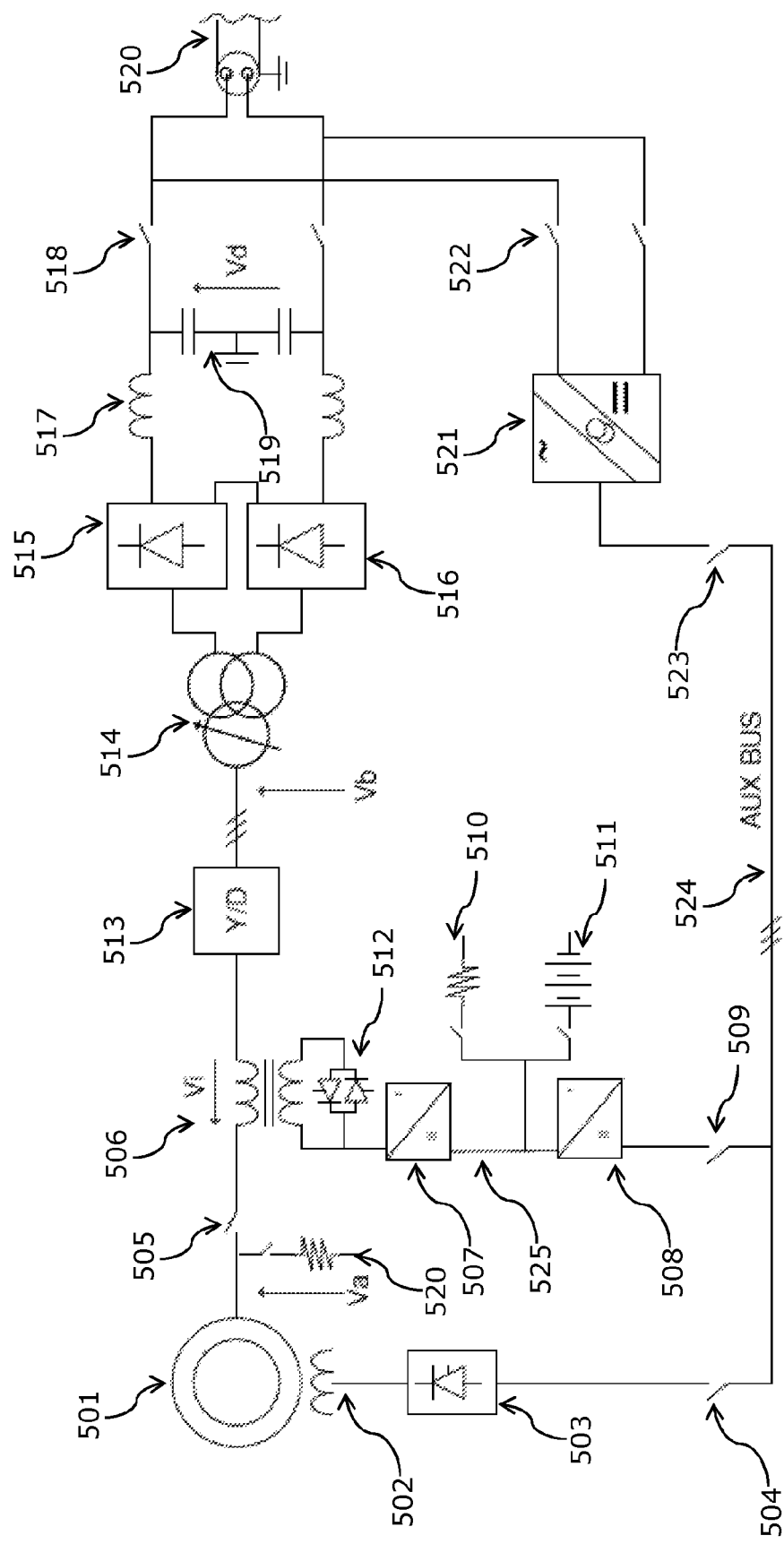
FIG. 5a shows embodiment of proposed turbine generation system for DC connection.
Figure 5B:
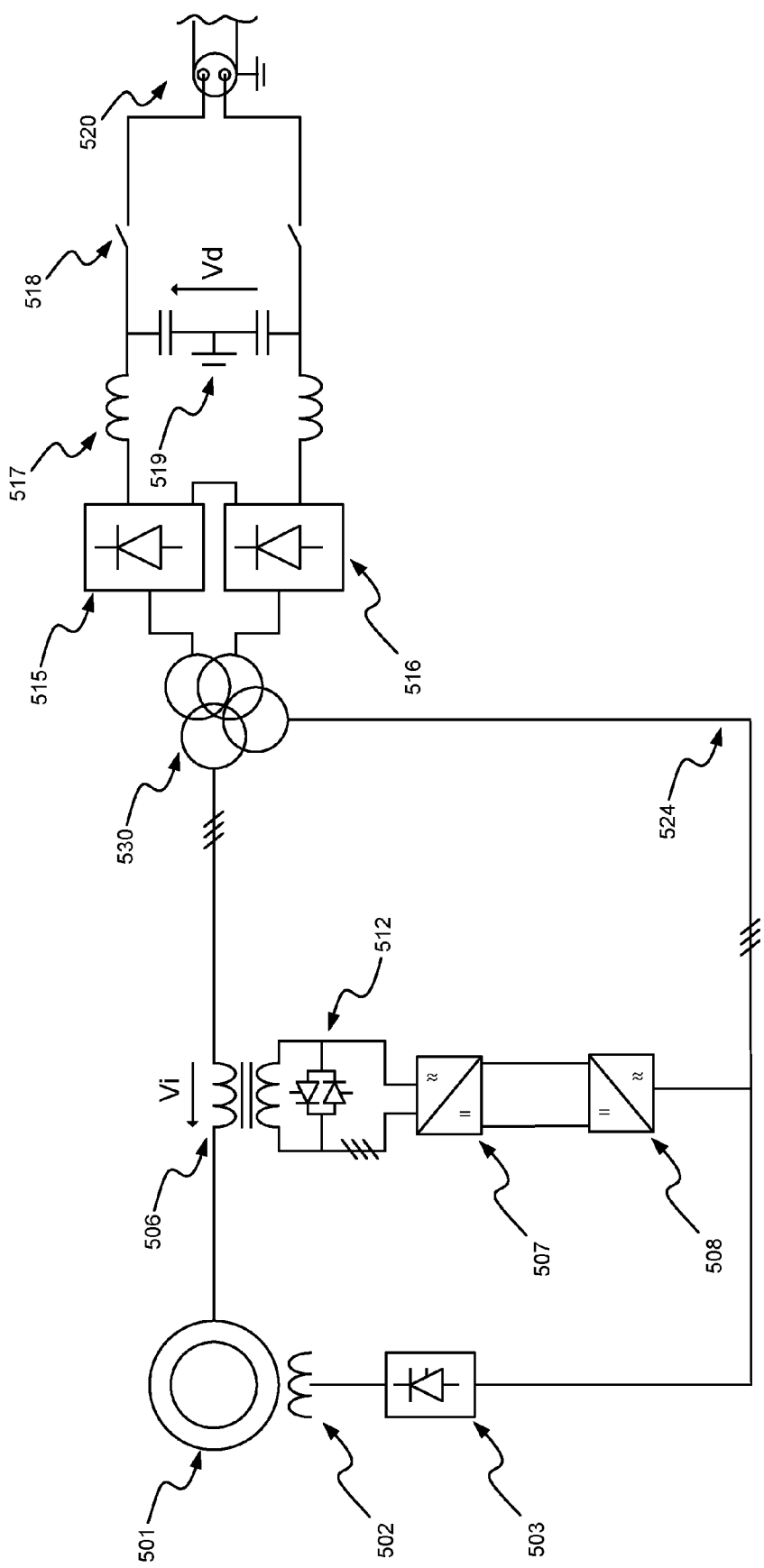
FIG. 5b shows embodiment of proposed turbine generation system for DC connection.

The present invention comprises a suite of variants to the base circuit (see FIG. 5a and FIG. 5b). The DC collector cable 520 connects to the passive rectifier circuit with a DC voltage "Vd".

Figure 4:
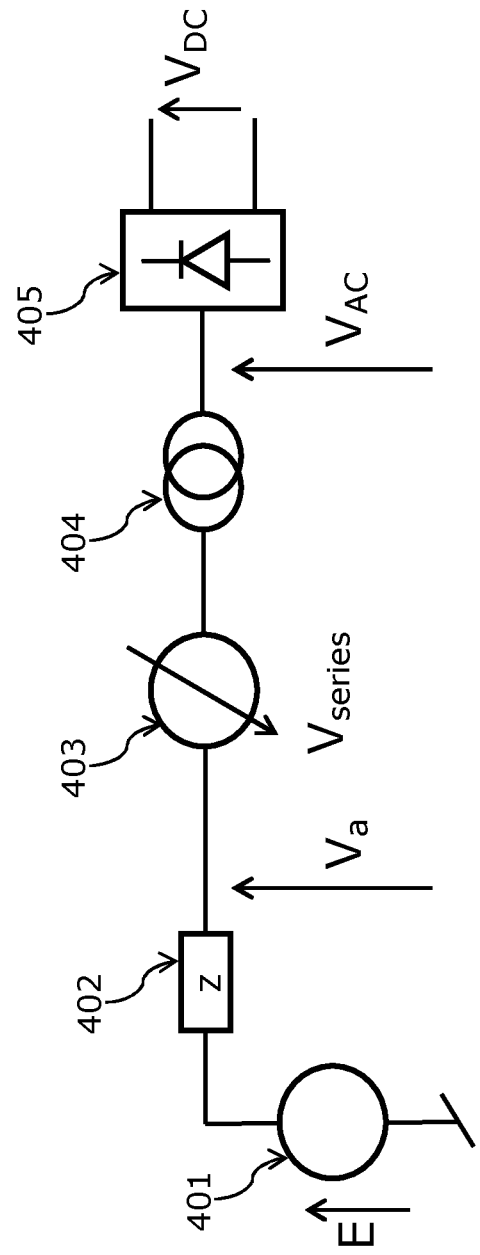
FIG. 4 shows the schematics of the present invention.

FIG. 4 shows a schematic of the principle of the present invention. As described above the problem of the setup in FIG. 1-3 is mainly that the a renewable energy source, such as wind power often doesn't provide a constant mechanical power to the shaft of the generator, thus the EMF fluctuates and so does the voltage level of the generator terminals.

$$V_a = E + Z \cdot I_a = E + (R_a + j\omega L_s) \cdot I_a \approx E_g + X_s \cdot I_b$$

Wherein $L_s$ is the synchronous inductance, and Z is the generator impedance. The resistive term is neglected in the last calculation in the right side.

FIG. 4 shows a generator with an EMF 401 and impedance 402, that together decides the generator voltage level $V_a$, as mentioned above does the EMF depend on the rotor speed. At the right side of FIG. 4 is a rectifier 405, for providing DC power into a cable (not shown in FIG. 4) with a given DC voltage level. The DC voltage level is regulated further downstream by system operators. Thus the AC voltage level $V_{AC}$ shall be controlled in respect of $V_{DC}$ so power can flow through the rectifier 405. The transformer 404 provides a voltage step-up. The voltage source 403 ensures a voltage balance so that:

$$V_{AC} \approx V_A + V_{series},$$

where $V_{series}$ is the voltage drop across the voltage source 403.

In an embodiment the rectifier 405 may be an active rectifier, either with a full bridge of controllable switches, or a half bridge. The controllable switch can be IBGT, GTO, IGCT, Thyristor or similar types.

In another embodiment the rectifier 405 is a passive rectifier with diodes.

The diode bridge or rectifier bridge 405, 515, or 516 will rectify only if $V_b$ exceeds the ac equivalent of the dc-link voltage, $V_d$. Hence at low speed, the generator excitation must be high to maximize the generator AC voltage, just to allow rectification. At higher speed, the challenge is to control the generator voltage precisely and fast enough that the electrical power flow is controlled. Hence, to meet all requirements without over dimensioning the generator, four means to control power flow are proposed in the main circuit:
  a. Generator excitation
  b. Series-injection transformer & converter
  c. Transformer Y/Δ-winding configurator
  d. Transformer on-load tap-changer FIG. 5a shows a more detailed circuit of an embodiment of the power generation system for DC connection. The main power producing component is a wound-rotor synchronous generator 501. Series-injection transformer 513 connected with a converter 507. Y/D-winding configurator 513. Transformer with on-load tap changer on LV side 514. 12-pulse rectifier 515, 516 on HV side. Auxiliary supply 524 via a dedicated HV auxilliary converter 521.

The synchronous generator 501 outputs an AC voltage "Va". The synchronous generator 501 connects to a series transformer 506 used to insert an AC voltage "Vi" in series with the generator voltage, Va, to produce the resulting voltage "Vb" fed to the main transformer 514, stepping it up before the rectifier 515, 516.

The main transformer 514 can with advantage employ two high-voltage windings, 30° displaced, and feeding stacked rectifiers 515, 516 in 12-pulse arrangement. 6-pulse or 18- or 24-pulse can also be envisaged.

In more detail FIG. 5a disclose the generator 501, with field winding 502, which is supplied by an exciter 503. The generator 501 is equipped with a safety dump load 520, and a circuit breaker 505 for disconnecting the generator from the power system. The circuit breaker 505 connects to a series transformer 506, through the primary (first) set of windings; the secondary (second) set of windings is connected to an inverter 507 and in parallel to a crow bar 512. The crow bar 512 can clamp the voltage across the secondary set of windings, and thus also reduce the voltage drop, $V_i$ close to zero. Block 513 represents a delta/wye coupling 513.

The transformer 514 (either 3-phase 3-limb or single-phase) windings can be arranged either in star or delta configuration, changing the transformer transfer ratio from 1:N to 0.58:N.

Instead of changing the transformer winding connections, the generator windings could be re-arranged.

In an embodiment the transformer 514 and/or generator 501 is equipped with a delta/wye coupling 513.

The delta/wye coupling 513 means that either the generator terminals and/or the transformer terminals are arranged with a coupling device, which can be a contactor or a solid state switch, which can change the three phase connection from delta configuration to a wye configuration and reverse. The delta/wye coupling 513 change the voltage level by a factor of sqrt(3). If the delta/wye coupling 513 is performed both at the transformer 514 and at the generator 501 it changes the voltage level by a factor 3, depending on the starting point.

The winding configuration should not be switched too frequently, to avoid loss of production. Hence, switching would be initiated based on longer-term power (speed) level, as an offset to the excitation operating point.

In an embodiment the delta/wye coupling 513 is used as the primary voltage adaptions means between the generator 501 and the transformer 514. As a variant the rectifier-side can also be the reconfigurable one.

In another embodiment the delta/wye coupling 513 is used together with either a series connected voltage source unit 506 or an on-load-tap changer on the transformer 514

The main transformer 514 has three set of windings, two high voltage windings, which each connects to two rectifier bridges 515, 516 connected in series and with an inductor 517 and a DC link 519 in parallel. Rectifier 515, 516 can be disconnected from the DC transmission cable 520 through a set of DC circuit breakers 518.

As an option to change the transformer winding ratio in steps of for example 2% over a range of ±20%, an on-load tap-changer (OLTC) based on solid-state switching (thyristors) could be employed. The tapped windings will increase the transformer cost, as will the thyristor arrangement, and losses. The advantage is that the winding ratio can be altered quasi-continuously. The OLTC can be used, as the Y/Δ configurator, to offset the excitation point, or on a continuous basis as a faster complement to the excitation control.

In an embodiment the tap-changer 514 is integrated into the transformer enclosure, and/or insulation and cooling is also possible.

Injecting a voltage in series with the generator voltage is another means of power flow control. The transformer 506 allows the current/voltage of the converter to be chosen freely from the generator voltage and current. The circuit includes a fast bypass switch "crow bar" 512 in case of short-circuits upstream of series-transformer.

If only quadrature voltage (reactive power) is exchanged via the series-transformer, then no active power flow is required from the converter dc-link 525. However, the controllability of the main power flow is higher if not only reactive, but also active power can be injected and absorbed.

To allow this, the dc-link 525 must connect either to a storage element 511, a dump-load 510 or an inverter 508, or combinations of these.

The reactive power insertion can be capacitive to balance generator and transformer inductive consumption, in turn allowing the generator size to be reduced (maximum torque per ampere).

The active power insertion can be bidirectional to balance out changes in wind speed and changes in collector voltage.

If the balancing power is limited in magnitude, and of cyclic nature, then the dc-link storage 511 function can be engaged, or even a dump-load 510.

If active power must be transferred on a more continuous basis, an inverter 508 can feed/drain the turbine auxiliary bus 524.

In an embodiment the injection of voltage in series is done by connecting a power converter directly in series without a transformer. An example of such a power converter can be single phase H-bridges, one for each electrical phase.

FIG. 5b shows an embodiment of the invention similar to FIG. 5a, where the output of the inverter 508 and/or the auxiliary system 524 is connected to a tertiary winding in the transformer 530. Although all the features of FIG. 5a is not shown in FIG. 5b, the teaching of FIG. 5a can nevertheless also be used in the embodiment of FIG. 5b.

In an embodiment the rectification from AC power to DC power, happens in a 6-pulse rectifier 515, meaning that the transformer 514, 530 has a primary side which connects to the generator side of the circuit and a secondary side connecting to the rectifier 515, and optionally a tertiary winding for the auxiliary system 524.

Figure 6:
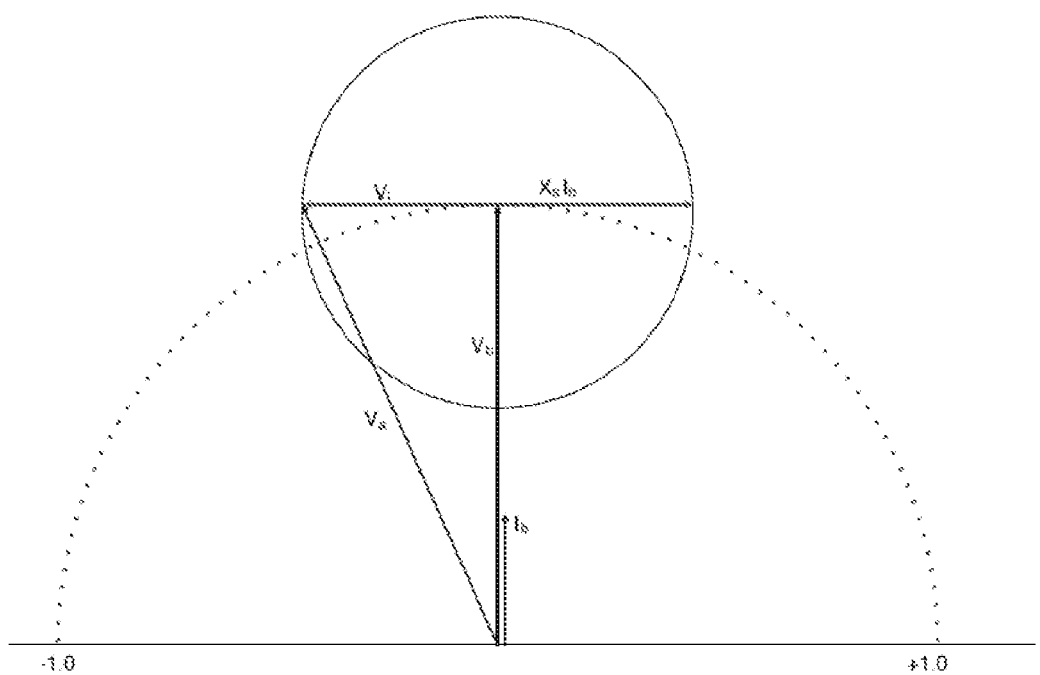
FIG. 6 shows the circuit's equivalent phasor diagram for series injection of reactive power only.
Figure 7:
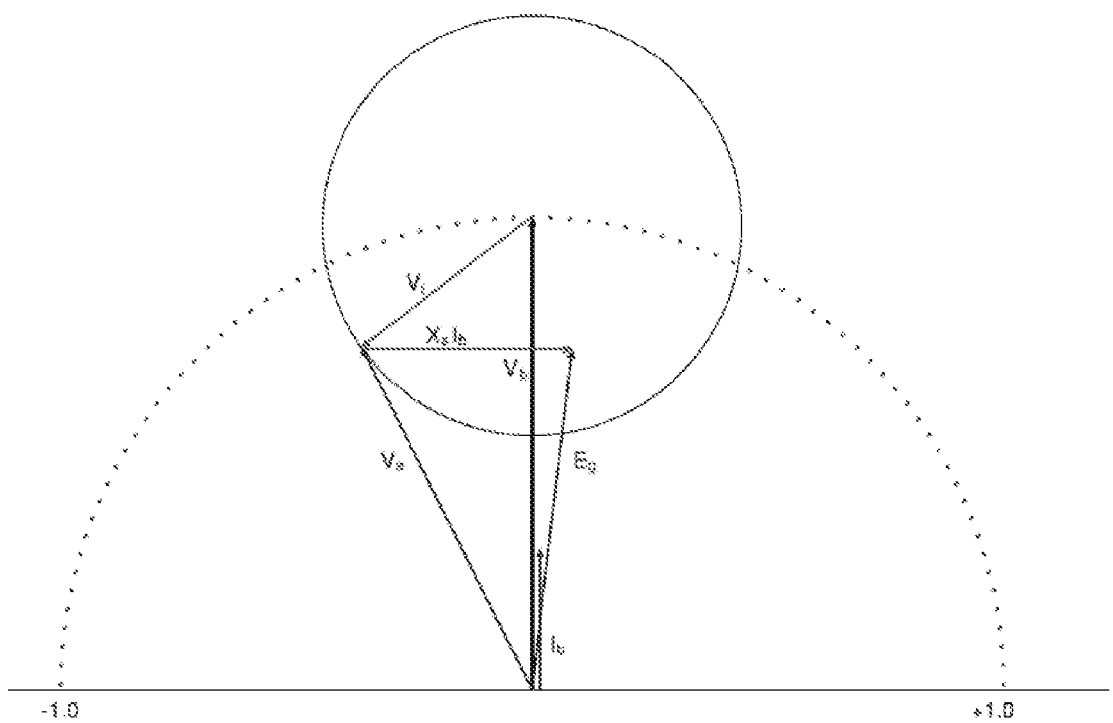
FIG. 7 shows series injection of both active and reactive power.
Figure 8:
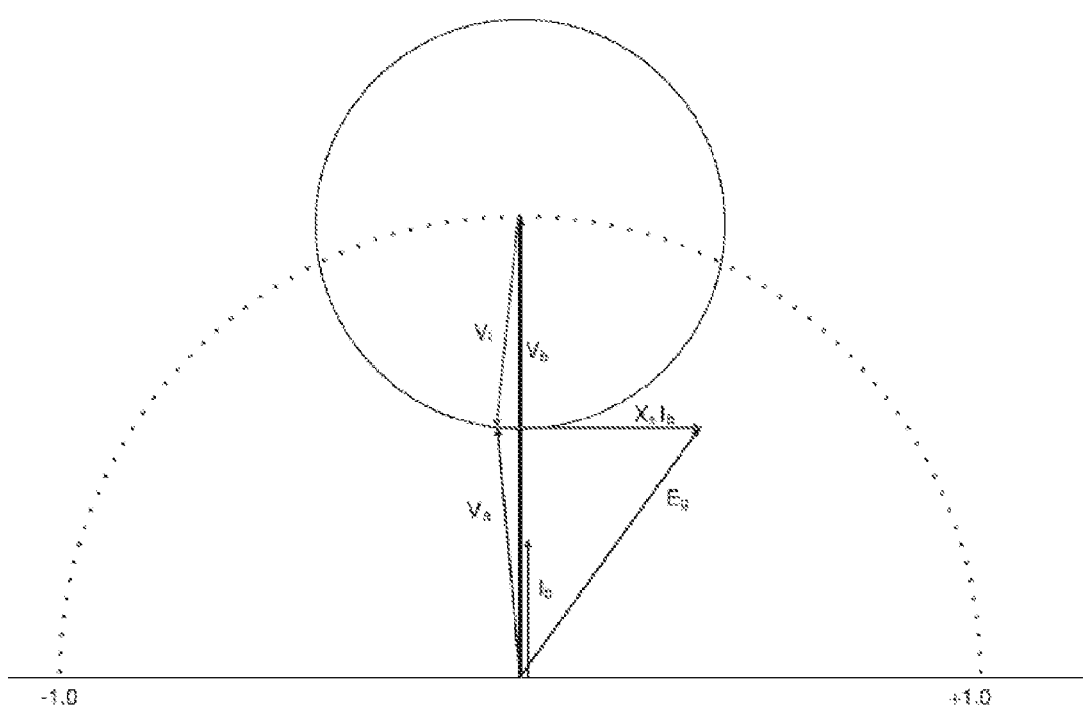
FIG. 8 shows series injection of active power only.

The following FIG. 6 to FIG. 8 show examples of the circuit's equivalent phasor diagram for series-injection of reactive and active power with only active power flowing to the transformer 514 (reactance neglected, i.e. resistive load). The voltage source unit 403 is controllable, so the phase angle between the voltage vector of the AC side of the rectifier 405 and the voltage vector of the voltage source unit 403 can be regulated, also the amplitude of the voltage vector of the voltage source unit can be regulated.

In an embodiment voltage source unit 403 is controlled based measured reactive power and measured active power in the system.

FIG. 6 shows a phasor diagram with a series injection of reactive power only. The voltage phasor $V_b$ (where $V_b$ is equivalent to $V_{AC}$) and the current phasor $I_b$ are in phase with each other, i.e. only active power to the transformer. The product between the synchronous impedance $X_s$ and the current $I_b$, (a voltage) results in a phasor perpendicular to the current phasor. Equally will a pure injection of reactive power from the series source result in a phasor $V_i$ (where $V_i$ is equivalent to $V_{series}$) perpendicular to voltage phasor $V_b$, and in opposite direction of $X_s I_b$, thus the terminal voltage phasor $V_a$ is the resulting phasor, so $$V_b = V_a + V_i$$

FIG. 7 shows a phasor diagram with injection of both active and reactive power. The voltage phasor $V_b$ (where $V_b$ is equivalent to $V_{AC}$) and the current phasor $I_b$ are in phase with each other, i.e. again only active power is supplied to the transformer. When the series source is to supply active and reactive power, the phasor $V_i$ needs to have an active and a reactive component, and thus the phasor $V_i$ points to the left and down, again the phasor $V_a$ is the resulting phasor. The back EMF phasor $E_g$ is given by the sum:

$$V_a = X_s I_b + E_g$$

FIG. 8 shows a phasor diagram with injection of nearly active power only. The different phasors are equal to those described in FIGS. 6 and 7, the phasor $V_i$ points nearly straight downwards, and thus allowing a substantial reduction in the generator voltage $V_a$ as phasor $V_i$ and phasor $V_a$ are parallel but with opposite directions, similar will the back EMF also be reduced.

From FIG. 6-8 it can be seen that the largest reduction in generator voltage $V_a$ is best be handled by injection of active power, or a combination of reactive and active.

FIG. 6-8 are to be used for understanding the power flow to and from the series source. In reality the generator voltage does not vary as much as shown in FIG. 6-8.

Figure 9:
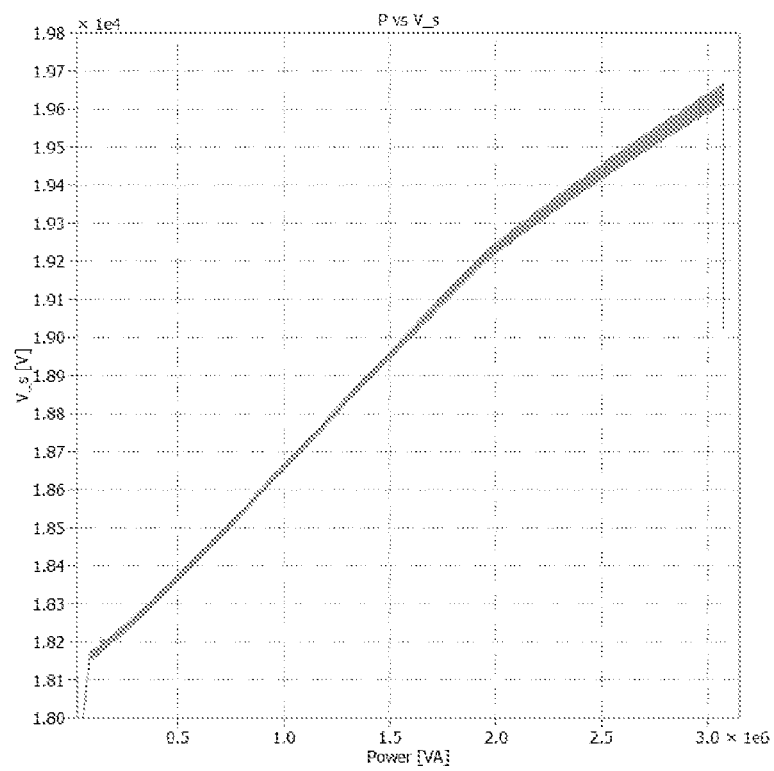
FIG. 9 shows generator voltage vs. power.

The generator voltage variation is simulated in FIG. 9 over a wind turbine generator's complete speed and power range with only rotor excitation as means for control of generator voltage, and thus, power. The machine in the simulation is a 3 MVA, 20 kV, 50 Hz.

Figure 10:
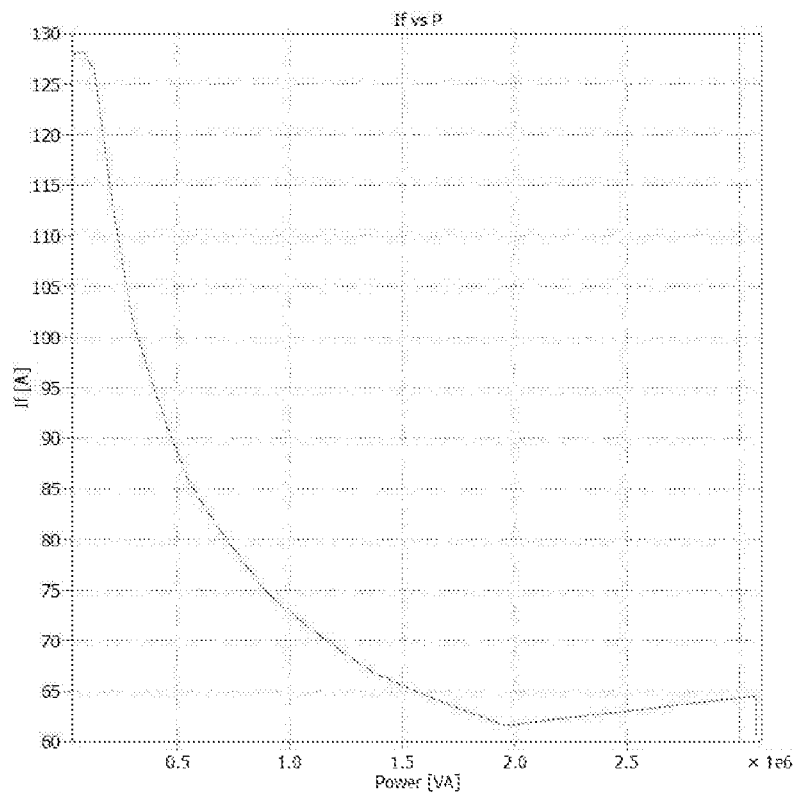
FIG. 10 shows generator field current vs. power.

The flux current vs. power can be seen in FIG. 10, at low power the magnetic flux in the machine nearly saturates. Over the full power range the flux current only varies with a factor 2.

FIG. 9 shows that the generator voltage $V_a$ (V_s) varies about 10% over the full power range.

At low generator rotational speed the power output will also be low; this follows from a well-known generic power-speed curve for a wind turbine generator. In a situation with low generator voltage, see FIG. 9, there will therefore also be low active power output from the wind turbine generator. That again means that the series source unit only needs to provide a relatively low amount of active to provide the required support in order to keep the voltage at the rectifier stable.

The inverter setup in the series link comprises an AC/DC inverter 507 connected to a DC link 525 at the DC side and a secondary side of the series transformer 506 and another AC/DC inverter 508 connected between the DC link 525 and the auxiliary bus 524.

In an embodiment the DC link comprises a dump load circuit 510 for dissipating excess power.

A wind turbine generator requires a small percentage of its produced power for auxiliary power, this power is required for operating various processes in the wind turbine generator itself, that maybe, but not limit to, hydraulic pumps for pitch actuation or electrical pitch motor, yaw motors and electrical consumption for powering turbine controller and internal lights etc. (none of it is shown in the figures)

The auxiliary power in a wind turbine generator normally accounts for 3-5% of rated power of the wind turbine generator in production mode. If the turbine is idling and not producing power the auxiliary power may be as little as less than 1% of rated power.

In an embodiment the excitation unit is fed from the auxiliary power system 524. The auxiliary power system is connected to the DC grid through an auxiliary converter 521. The auxiliary converter 521 may be disconnected from the DC system through a circuit breaker 522. Various branches of the auxiliary power system may also be disconnected by circuit breakers 504, 509, 523.

In an embodiment the excitation unit is fed from the auxiliary power system 524. The auxiliary power system 524 is connected to the electrical system through a tertiary winding of the transformer 530.

Although the generator in the present embodiment is a synchronous generator, the type of generator is not limited to this type, other types of generators such as induction generator etc. can also be used.

The present invention is suitable for any kind of generator, but due to the issue providing reactive power to an induction generator, such a generator type may not be preferred. With the series voltage source and an inverter it will be possible to provide reactive power, but the p.u. rating for the inverter may reach 20-30% during start up.

In an embodiment the generator is a permanent magnet synchronous generator with a rotor comprising permanent magnets. Such a rotor may be any known type of permanent magnet rotor. A disadvantage of using a permanent magnet generator is that the stator voltage is proportional to the rational speed, due to the properties of the synchronous generator 501 mentioned above.

In an embodiment the series source inverter has a second inverter 508, i.e. a back to back inverter system 507, 508, which is connected to the auxiliary power system 524. This means that in operational mode there is a complex power flow as the excitation system requires power. The various auxiliary components consumes power, but depending on the actual rating of the series inverter 508 most of the auxiliary power can be delivered through this, meaning that the power flow from the DC grid 520 is reduced.

In an embodiment where the series inverter does not comprise the additional inverter bridge 508 all the aux power 524 needs to come from the DC grid 520.

In an embodiment the exciter 503 is supplied directly from the DC link 525.

In no load, idling or start up, the power flow diagram looks somewhat different, as all the auxiliary power needs to come from the DC grid 520.

In an embodiment doing no load, idling or start up, the auxiliary power is minimized by an optimal operation of the various loads, e.g. the hydraulic pump at each wind turbine generator may not have to operator all the time, and similar for yaw motors and other loads.

In an embodiment the converter 507, 508 is made of forced-commutated switches, such as IGBT, GTO, IGCT, thyristors or similar. This allows the converter to operate in all 4 quadrants, and thus have active power flow from AC to DC and DC to AC.

In an embodiment the converter 507 is made force commutated switches, such as diodes. This limits the converter to only be able to have a power flow from AC to DC.

In an embodiment of the present invention the power generator and its excitation system is designed for an operational speed range, meaning that the generator will not suffer from magnetic saturation in the full speed range, see FIG. 10. Even though an wind turbine generator can operate at low speed, there will be a minimal rotation even at very low wind speed.

Figure 11:
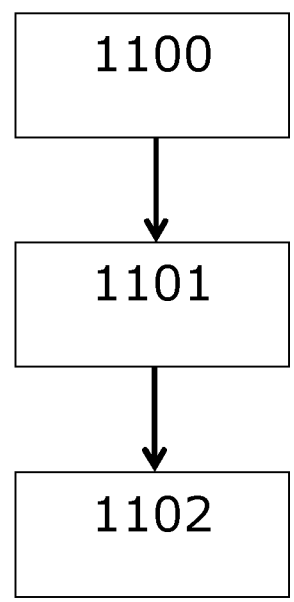
FIG. 11 shows a flow-chart of a method according to the invention.

FIG. 11 shows a flow chart of a method according to the invention for connecting a power generator to a DC electrical power system. Step 1100 is connecting in series a voltage source unit, that receives AC electrical power from the power generator, Step 1101 is controlling the AC electrical power, from the power generator and the voltage source unit to a rectifier, by adjusting at least one electrical parameter of the voltage source unit, and Step 1102 is rectifying the AC electrical power to DC electrical power to be provided to the DC electrical power system.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A connection system for connecting an alternating current (AC) power generator to a direct current (DC) collector grid, the connection system comprising:
    a controllable voltage source unit comprising:
        a transformer comprising:
            a primary set of windings configured to receive a first AC electrical power generated by the power generator and to output a second AC electrical power, and
            a secondary set of windings, and
        a converter configured to provide a third AC electrical power to the secondary set of windings; and
    a rectifier configured to:
        rectify a fourth AC electrical power that is based on the secondary AC electrical power; and
        output, to the DC collector grid, a DC electrical power that is based on the rectified fourth AC electrical power.

2. The connection system according to claim 1, further comprising a main transformer arranged to step up an AC voltage level between said voltage source unit and said rectifier.

3. The connection system according to claim 1, wherein said power generator is a synchronous generator.

4. The connection system according to claim 1, wherein the converter comprises an inverter having an AC side and a DC side, said DC side connected to a DC link capacitor and said AC side connected with the secondary set of windings.

5. The connection system according to claim 1, wherein the converter further comprises one or both of a dump load unit and a storage device.

6. The connection system according to claim 1, wherein the converter comprises a second rectifier having an AC side and a DC side, said DC side of the second rectifier connected to said DC side of the inverter, and said AC side of the second rectifier connected to an auxiliary electrical system.

7. The connection system according to claim 2, wherein said main transformer comprises three sets of windings, and said rectifier comprises a first multi-phase rectifier bridge and a second multi-phase rectifier bridge, a first set of said three sets of windings connected to said voltage source unit, a second set of said three sets of windings connected to said first multi-phase rectifier bridge and a third set of said three sets of windings connected to said second multi-phase rectifier bridge.

8. The connection system according to claim 2, wherein the system comprises means for changing the winding configuration from a wye connection to a delta connection, said means being positioned in the main transformer or in the power generator.

9. The connection system according to claim 2, wherein said main transformer comprises an on-load-tap charger for changing a transformation ratio of said main transformer.

10. The connection system according to claim 3, further comprising an excitation unit for exciting a rotor field winding of said power generator, said excitation unit designed for an operational speed range.

11. A method for connecting an alternating current (AC) power generator to a direct current (DC) collector grid, the method comprising:
    connecting a voltage source unit in series with the power generator, the voltage source unit comprising:

a transformer comprising a primary set of windings that receives a first AC electrical power from the power generator, and a secondary set of windings; and a converter configured to provide a second AC electrical power to the secondary set of windings;

outputting, from the primary set of windings, a third AC electrical power that is based on the first AC electrical power;

rectifying, using a rectifier, a fourth AC electrical power that is based on the third AC electrical power; and outputting, to the DC collector grid, a DC electrical power that is based on the rectified fourth AC electrical power.

12. The method according to claim 11, further comprising:

adjusting at least one electrical parameter of the voltage source unit, wherein the at least one electrical parameter comprises one or both of an electrical voltage phase angle between the voltage source unit and the rectifier and an amplitude of the voltage of the voltage source unit.

13. A power generation system for connecting to a direct current (DC) collector grid, the power generation system comprising:

a wind turbine having an alternating current (AC) power generator;

a main transformer with at least a first set of windings and a second set of windings;

a controllable voltage source unit arranged in series between the power generator and the main transformer, wherein the voltage source unit comprises a second transformer, the second transformer comprising:

a primary set of windings configured to receive a first AC electrical power generated by the power generator, and to output a second AC electrical power; and a secondary set of windings configured to receive a third AC electrical power;

a rectifier arranged between the main transformer and the DC collector grid, the rectifier configured to:

rectify a fourth AC electrical power that is based on the second AC electrical power; and output, to the DC collector grid, a DC electrical power that is based on the rectified fourth AC electrical power; and a coupling device configured to change a connection configuration in at least one of said power generator and said main transformer between a delta connection and a wye connection.

14. The power generation system according to claim 13, wherein said voltage source unit further comprises:

a converter configured to provide the third AC electrical power to the secondary set of windings.

15. The power generation system according to claim 13, wherein said main transformer comprises an on-load-tap charger for changing a transformation ratio of said main transformer.

16. The power generation system according to claim 14, wherein the converter comprises an inverter having an AC side and a DC side, the DC side connected to a DC link capacitor and the AC side connected with the second set of windings.

17. The power generation system according to claim 16, wherein the converter further comprises a second rectifier having an AC side and a DC side, the DC side of the second rectifier connected to the DC side of said inverter, and the AC side of said converter connected to an auxiliary electrical system.

18. The connection system according to claim 2, wherein the main transformer comprises:

a first set of windings connected with the voltage source unit;

at least one second set of windings connected with the rectifier; and a third set of windings connected with an auxiliary electrical system.

19. The connection system according to claim 18, wherein the auxiliary electrical system is configured to provide power to one or both of: (1) a converter system configured to output the third AC electrical power to the second set of windings, and (2) an excitation unit for exciting a rotor field winding of the power generator.

* * * * *